United States Patent Office 3,382,282
Patented May 7, 1968

3,382,282
PROCESS FOR 2-LOWER ALKYL CYCLO-
PENTANE-1,3-DIONES
Victor J. Grenda, Edison, and Norman L. Wendler, Summit, N.J., assignors to Merck & Co., Inc., Rahway, N.J., a corporation of New Jersey
No Drawing. Filed Oct. 16, 1964, Ser. No. 404,479
7 Claims. (Cl. 260—586)

This invention relates to chemical intermediates. More particularly, it relates to the preparation of 2-lower alkyl substituted cyclopentane-1,3-diones. The compound 2-methyl-cyclopentane-1,3-dione is a known compound useful for the preparation of physiologically active steroids such as 19-nortestosterone according to known procedures. Other lower alkyl substituted compounds prepared in accordance with the process of this invention may be similarly employed for the preparation of useful 18-homologues of the aforesaid physiologically active steroids which are similarly active or are useful for comparative structural studies designed to determine the effect of structural variations of physiologically active steroids.

In accordance with the presently preferred process of this invention, the desired compounds are prepared by reacting succinic anhydride or a succinyl halide with an enol acylate of a lower alkanone, under Friedel-Crafts conditions. The intermediate 2-acylated-2-lower alkyl substituted-cyclopentane-1,3-dione need not be isolated and separately hydrolyzed to the final nonacylated product. This is in direct contrast to the procedure for the preparation of the corresponding 2-dealkylated compound in which a 2-acylated-cyclopentane-1,3-dione is isolated and heated with water or dilute mineral acid to effect deacylation.

In carrying out the process of this invention succinic anhydride or a succinyl halide such as succinyl chloride is reacted with the enol acylate of a lower alkanone, for example a straight chain alkanone containing up to eight carbon atoms. The preferred enol acylates are derived from methyl-lower alkyl ketones or symmetrical di-lower alkyl ketones in which the alkyl group contains one more carbon atom than the group to be substituted at the 2-position of the cyclopentane-1,3-dione. The enol acylate preferred for the preparation of 2-methyl-cyclopentane-1,3-dione is derived from methyl ethyl ketone or diethyl ketone. Ethyl propyl ketone can be utilized, but is not preferred since the desired 2-methyl-cyclopentane-1,3-dione must be separated from substantial quantities of the 2-ethyl homologue which is formed simultaneously. Surprisingly, only minor amounts of cyclopentane-1,3-dione, that is the dealkylated compound, are formed when enol acylates of methyl lower alkyl ketones are used as starting compounds. In fact, the enol acylates of methyl lower alkyl ketones such as methyl butyl ketones are preferred for the practice of this invention. This is especially fortuitous since they are the most readily available.

The specific acylate group in the enol acylate is not critical. The preferred acyl substituents, however, are lower hydrocarbon acyl groups containing up to four carbon atoms. Acetyl enolates are especially preferred for reasons of economics and availability.

Reaction is effected in a reaction inert organic solvent of the class generally employed in Friedel-Crafts reactions and halogenated aliphatic hydrocarbon solvents containing up to three carbon atoms are especially useful. Aromatic hydrocarbons in which the hydrogen atoms of the aromatic group are resistant to substitution may also be employed. Examples of useful solvents include methylene, dichloride, ethylene dichloride, carbon tetrachloride and nitrobenzene.

The preferred Friedel-Crafts catalyst is aluminum chloride. However, the process is not limited to the use of this reagent since other Lewis acids such as hydrogen fluoride or titanium tetrachloride may also be useful. The molar quantity of catalyst used in the invention may vary within rather wide limits. To insure best yields however a molar excess from about 2 to about 3 based on the amount of anhydride used will generally be employed. The yields may be relatively lower if a lesser amount of catalyst is used, and the advantages of using more than a 3 molar excess of catalyst do not compensate for the added cost. The preferred range for catalyst employed is from 2.2 to 2.4 molar excess.

While some product can be obtained using an excess of either reactant, best results are achieved utilizing a molar excess of enol acylate. It is preferred to use from 2% to 10% molar excess of the enol derivative, but useful results are obtained by the use of from at least an equimolar amount to about a 2 molar equivalent of the acylate.

The preferred procedure for carrying out the process of this invention is to add the enol acylate to the anhydride or acid chloride. This mode of operation minimizes the formation of side products as a result of reaction of enol acylate molecules with each other. The formation of undesirable side products is also minimized by performing the reaction in an inert atmosphere, for example a nitrogen atmosphere. Neither of these criteria, however, is essential.

As a practical matter the best operating conditions for carrying out the reaction are at a temperature of from about 80° C. to 90° C. during a period of from about one to four hours. The reaction rate can be enhanced by increasing the temperature for example to 110° C. or even higher. At this higher temperature, reaction may be complete in one half hour or less. At lower temperatures, for example about 30° C. to 40° C. the reaction may not be complete for up to 48 hours, or more. The yield, however, is not significantly influenced.

At the end of the reaction period the mixture is quenched by the addition of dilute acid. Inorganic acids, especially mineral acids such as hydrochloric, sulfuric, nitric or phosphoric are preferred. During the quenching operation, the temperature is maintained at from about 25° C. to about 90° C., preferably 25° C. to 40° C., with exterior cooling if necessary.

The desired product is obtained by extraction of the aqueous layer with a solvent which is substantially water immiscible. Lower oxygenate, polar solvents including alcohols, ketones and esters are useful. Isopropanol, butanol, methyl isobutyl ketone and ethyl acetate are typical extraction solvents. It is most convenient to extract continuously. The product crystallizes from solution as the solvent cools. Alternatively, the product may be extracted by simply shaking the aqueous layer of the reaction mixture with the selected solvent and then concentrating the organic layer to effect crystallization. In any event, the product is recovered by filtration.

The following non-limiting examples are given by way of illustration only.

Example I

A stirred suspension of 30 g. of aluminum chloride in 100 ml. of 1,2-dichloroethane is treated at 10° C. with 15.5 g. of succinyl chloride and 17.1 g. of the enol acetate of butanone-2-(2-butene-2-ol acetate) is added over a 15 minute period while maintaining the temperature at 38–40° C. The mixture is refluxed for one hour, cooled to 25–35° C., and 100 ml. of 5 N hydrochloric acid added at 25–35° C. The layers are separated and the aqueous layer extracted with two 10 ml. portions of dichloroethane. It is then continuously extracted with methyl isobutyl ketone.

The product, 2-methyl-cyclopentane-1,3-dione, separates on cooling and is recovered by filtration.

Example II

A stirred suspension of 30 g. of aluminum chloride in 100 ml. of nitrobenzene is treated at 10° C. with 10 g. of succinic anhydride and 17.1 g. of the enol acylate of butanone-2 added over a 15 minute period, while maintaining the temperature at 38–40° C. The mixture is heated at 82° C. for four hours and 100 ml. of 5 N hydrochloric acid added continuously while controlling the temperature at 25–35° C. The reaction mixture is worked up and the product isolated as described in Example I.

Example III

A total of 23.8 g. of thionyl chloride is added to 10 g. of succinic anhydride in 50 ml. of nitrobenzene and the mixture heated at 80–100° C., for one hour. The mixture is cooled and 26.7 g. of aluminum chloride added with cooling to maintain the temperature at 25–50° C. To this mixture, 12.5 g. of the enol acetate or butanone-2 is added while keeping the temperature below 90° C. and the mixture heated at 90° C. for one hour. The reaction is quenched with 100 ml. of 2 m. sulfuric acid at 85–90° C. and the aqueous layer continuously extracted with methyl isobutyl ketone. The product is recovered by filtration after cooling the solution.

The following table summarizes nine examples utilizing the process of this invention with one mole of succinic anhydride (Examples IV to VII), succinyl chloride (Examples VIII to IX) and succinyl bromide (Examples X to XII).

What is claimed is:

1. A process which comprises reacting succinic anhydride with an enol lower hydrocarbon alkanoate of a lower alkanone containing from four to eight carbon atoms in the presence of aluminum chloride at a temperature from about 30° C. to about 110° C. and quenching the reaction mixture with aqueous acid to produce a 2-lower alkyl substituted cyclopentane-1,3-dione.

2. A process which comprises reacting succinyl chloride with an enol lower hydrocarbon alkanoate of a lower alkanone containing from four to eight carbon atoms in the presence of aluminum chloride at a temperature from about 30° C. to about 110° C. and quenching the reaction mixture with aqueous acid to produce a 2-lower alkyl substituted cyclopentane-1,3-dione.

3. A process which comprises reacting succinyl bromide with an enol lower hydrocarbon alkanoate of a lower alkanone containing from four to eight carbon atoms in the presence of aluminum chloride at a temperature from about 30° C. to about 110° C. and quenching the reaction mixture with aqueous acid to produce a 2-lower alkyl substituted cyclopentane-1,3-dione.

4. A process which comprises reacting succinic anhydride with 2-butene-2-ol lower hydrocarbon alkanoate in the presence of aluminum chloride at a temperature from about 30° C. to about 110° C. and quenching the reaction mixture with aqueous mineral acid to produce 2-methyl-cyclopentane-1,3-dione.

5. A process which comprises reacting succinyl chloride with 2-butene-2-ol lower hydrocarbon alkanoate in the presence of aluminum chloride at a temperature from about 30° C. to about 110° C. and quenching the reaction mixture with aqueous mineral acid to produce 2-methyl-cyclopentane-1,3-dione.

6. A process which comprises reacting succinyl bromide with 2-butene-2-ol lower hydrocarbon alkanoate in the presence of aluminum chloride at a temperature from about 30° C. to about 110° C. and quenching the reaction mixture with aqueous mineral acid to produce 2-methyl-cyclopentane-1,3-dione.

7. A process which comprises reacting succinic anhydride or succinyl chloride with an enol lower hydrocarbon alkanoate of a lower alkanone under Friedel-Crafts conditions at a temperature from about 30° C. to about 110° C. and quenching reaction mixture with aqueous acid thereby forming a 2-alkyl-cyclopentane-1,3-dione.

| Ex. | $R_1$ (in succinyl reactant) | Moles of Catalyst | Solvent | Enol Acylate Moles | Enol Acylate Acylate | Ketone $R_2$ | Ketone $R_3$ | Hours | Temperature, °C | Acid | Extraction Solvent |
|---|---|---|---|---|---|---|---|---|---|---|---|
| IV | ME | 2 | $CH_2Cl_2$ | 2 | Acetyl | ME | ET | 48 | 30 | $H_2SO_4$ | $CH_3CH_2COOCH_2CH_3$ |
| V | ME | 2.2 | $C_6H_5NO_2$ | 2.6 | do | ET | ET | 0.5 | 110 | $H_2SO_4$ | $(CH_3)_2CHOH$ |
| VI | ET | 2.4 | $CCl_4$ | 2.8 | do | ME | PR | 4 | 80 | HCl | $CH_3(CH_2)_4OH$ |
| VII | ET | 3 | $C_6H_5NO_2$ | 3.3 | Propanol | PR | PR | 3 | 90 | $HNO_3$ | $CH_3COCH_2CH(CH_3)_2$ |
| VIII | ET | 2.1 | $C_6H_5NO_2$ | 4 | Butanoyl | ME | PR | 1 | 100 | HCl | $CH_3COCH_2CH(CH_3)_2$ |
| IX | PR | 2.0 | $C_6H_5NO_2$ | 3 | Acetyl | ME | BU | 2 | 90 | HCl | $CH_3COCH_2CH(CH_3)_2$ |
| X | PR | 2.6 | $C_6H_5NO_2$ | 3.1 | do | BU | BU | 3 | 80 | HCl | $CH_3COCH_2CH(CH_3)_2$ |
| XI | ME | 2 | $CH_2Cl_2$ | 2 | do | ME | ET | 48 | 30 | $H_2SO_4$ | $CH_3COCH_2CH(CH_3)_2$ |
| XII | ME | 2.2 | $C_6H_5NO_2$ | 2.6 | do | ET | ET | 0.5 | 110 | $H_2SO_4$ | $CH_3COCH_2CH(CH_3)_2$ |

References Cited

Nilsson et al.: Acta. Chem. Scand., vol. 17(6), pp. 1801–1802, 1963.

LEON ZITVER, *Primary Examiner.*

M. JACOB, *Assistant Examiner.*